(12) United States Patent
Sato et al.

(10) Patent No.: US 9,778,758 B2
(45) Date of Patent: Oct. 3, 2017

(54) ELECTRONIC DEVICE, DISPLAY CONTROL METHOD, AND DISPLAY CONTROL PROGRAM

(71) Applicant: Kyocera Corporation, Kyoto (JP)

(72) Inventors: Takayuki Sato, Daito (JP); Takahiro Nagaya, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/730,953

(22) Filed: Jun. 4, 2015

(65) Prior Publication Data

US 2015/0346846 A1  Dec. 3, 2015

Related U.S. Application Data

(63) Continuation of application No. 13/430,142, filed on Mar. 26, 2012.

(30) Foreign Application Priority Data

Mar. 28, 2011  (JP) ................................. 2011-069335

(51) Int. Cl.
*G06T 19/00* (2011.01)
*G06F 3/0346* (2013.01)
(Continued)

(52) U.S. Cl.
CPC .......... *G06F 3/0346* (2013.01); *G06F 1/1694* (2013.01); *G06F 3/0482* (2013.01);
(Continued)

(58) Field of Classification Search
USPC ................................................ 345/419, 427
See application file for complete search history.

(56) References Cited

U.S. PATENT DOCUMENTS 6,300,933 B1 * 10/2001 Nagasaki .............. G06F 1/1626
345/685
6,327,514 B1 * 12/2001 Hazama ............. G05B 19/4097
700/145
(Continued)

FOREIGN PATENT DOCUMENTS

JP  2003-511786 A  3/2003
JP  2009-510643 A  3/2009
(Continued)

OTHER PUBLICATIONS

Office Action mailed Mar. 10, 2015, corresponding to Japanese patent application No. 2015-005408, for which an explanation of relevance is attached.
(Continued)

*Primary Examiner* — Kimbinh T Nguyen
(74) *Attorney, Agent, or Firm* — Hauptman Ham, LLP

(57) ABSTRACT

A cellular telephone device with a control unit sets a display mode of a display unit to any one of a first display mode for performing two-dimensional display, and a second display mode for performing three-dimensional display; the cellular telephone device displays both of first information and second information, which is subordinate information to the first information, on the display unit, in a case of being set to the second display mode; and the cellular telephone device displays any one of the first information and the second information on the display unit, in a case of being set to the first display mode.

9 Claims, 6 Drawing Sheets

(51) Int. Cl.
  *G06T 1/20* (2006.01)
  *G06T 15/00* (2011.01)
  *G06F 1/16* (2006.01)
  *G06F 3/0482* (2013.01)
  *H04M 1/725* (2006.01)
(52) U.S. Cl.
  CPC .............. *G06T 1/20* (2013.01); *G06T 15/00* (2013.01); *H04M 1/72544* (2013.01)

(56) References Cited

U.S. PATENT DOCUMENTS

| | | | |
|---|---|---|---|
| 6,577,330 B1 * | 6/2003 | Tsuda | G06F 3/04815 715/781 |
| 6,995,776 B2 * | 2/2006 | Tomita | G06F 1/1626 345/619 |
| 8,466,933 B2 * | 6/2013 | Nishikawa | G09G 5/00 345/619 |
| 8,531,452 B2 | 9/2013 | Inoue et al. | |
| 8,700,740 B2 | 4/2014 | Tanaka | |
| 9,055,164 B2 * | 6/2015 | Hasegawa | G04C 3/002 |
| 2006/0031876 A1 | 2/2006 | Ok et al. | |
| 2008/0225039 A1 | 9/2008 | Oshita et al. | |
| 2008/0316597 A1 * | 12/2008 | Tsai | G02B 27/2214 359/465 |
| 2009/0128484 A1 * | 5/2009 | Hanyu | G06F 3/0485 345/156 |
| 2010/0105429 A1 * | 4/2010 | Koitabashi | G06F 1/1616 455/556.1 |
| 2010/0262676 A1 | 10/2010 | Tanaka | |
| 2010/0263946 A1 | 10/2010 | Miyazaki | |
| 2010/0285844 A1 * | 11/2010 | Hosoi | G06F 1/1626 455/566 |
| 2011/0119629 A1 | 5/2011 | Huotari et al. | |
| 2011/0246877 A1 * | 10/2011 | Kwak | G06F 3/0488 715/702 |
| 2012/0056830 A1 | 3/2012 | Suzuki et al. | |
| 2012/0081356 A1 * | 4/2012 | Filippov | G06T 19/20 345/419 |

FOREIGN PATENT DOCUMENTS

| | | |
|---|---|---|
| JP | 2009-207589 A | 9/2009 |
| JP | 2010-199835 A | 9/2010 |
| JP | 2010-262469 A | 11/2010 |
| JP | 2012-58901 A | 3/2012 |
| WO | 01/27735 A1 | 4/2001 |
| WO | 2009/081582 A1 | 7/2009 |

OTHER PUBLICATIONS

Office Action mailed Mar. 10, 2015, corresponding to Japanese patent application No. 2015-005409, for which an explanation of relevance is attached.

Office Action mailed Mar. 10, 2015, corresponding to Japanese patent application No. 2015-005410, for which an explanation of relevance is attached.

Office Action mailed Mar. 10, 2015, corresponding to Japanese patent application No. 2015-005411, for which an explanation of relevance is attached.

Office Action mailed Sep. 30, 2014, corresponding to Japanese patent application No. 2011-069335, for which an explanation of relevance is attached.

Office Action mailed Jan. 13, 2014, corresponding to U.S. Appl. No. 13/430,142.

Office Action mailed Jul. 9, 2014, corresponding to U.S. Appl. No. 13/430,142.

Office Action mailed Oct. 8, 2014, corresponding to U.S. Appl. No. 13/430,142.

Office Action mailed Dec. 30, 2014, corresponding to U.S. Appl. No. 13/430,142.

Office Action mailed May 12, 2015, corresponding to U.S. Appl. No. 13/430,142.

* cited by examiner

ELECTRONIC DEVICE, DISPLAY CONTROL METHOD, AND DISPLAY CONTROL PROGRAM

CROSS REFERENCE TO RELATED APPLICATIONS

This application is a continuation of U.S. application Ser. No. 13/430,142 filed Mar. 26, 2012, which claims priority to and benefit of Japanese Patent Application No. 2011-069335, filed on 28 Mar. 2011, each of which is incorporated herein by reference in its entirety.

BACKGROUND

Field

The present invention relates to an electronic device including a touch panel, a display control method, and a display control program.

Description of Related Art

Conventionally, in order to improve the operability, a touch panel has been provided to electronic devices. For example, Japanese Unexamined Patent Application, Publication No. 2009-207589 discloses an electronic device that can display soft keys capable of assigning functions to and displaying the functions on touch panel areas along a monitor frame.

SUMMARY

However, in the electronic device disclosed in Japanese Unexamined Patent Application, Publication No. 2009-207589, when the number of functions is increased, it is difficult to display information such as soft keys. Moreover, when only the soft keys are displayed, it is difficult to recognize what functions are provided to the soft keys.

An object of the present invention is to provide an electronic device, a display control method and a display control program, all of which can efficiently display information in a display area.

An electronic device according to the present invention includes: a display unit; a mode setting unit that sets a display mode of the display unit to any one of: a first display mode for performing two-dimensional display; and a second display mode for performing three-dimensional display; and a control unit, and in a case of being set to the second display mode, the control unit causes the display unit to display both of first information and second information, which is subordinate information to the first information, and in a case of being set to the first display mode, the control unit causes the display unit to display any one of the first information and the second information.

Moreover, in the electronic device according to the present invention, in a case of being set to the second display mode, it is preferable for the control unit to cause the display unit to display the second information correspondingly to the first information.

In addition, in the electronic device according to the present invention, in a case of being set to the second display mode, it is preferable for the control unit to cause display unit to display the first information and the second information, at least one of which is displayed obliquely to another.

Furthermore, in the electronic device according to the present invention, in a case of being set to the second display mode, it is preferable for the control unit to cause display unit to display a virtual polyhedron composed of virtual faces in a three-dimensional manner, cause the display unit to display the first information on a first virtual face of the virtual polyhedron, and cause the display unit to display the second information on a second virtual face adjacent to the first virtual face.

Moreover, in the electronic device according to the present invention, in a case of being set to the first display mode, it is preferable for the control unit to cause the display unit to display any one of the first virtual face or the second virtual face in a two-dimensional manner.

In addition, it is preferable for the electronic device according to the present invention to further include a body including the display unit; and an inclination detecting unit that detects inclination of the body, and it is preferable for the mode setting unit to set the display mode to any one of the first display mode and the second display mode, in accordance with the inclination of the body detected by the inclination detecting unit.

Furthermore, in the electronic device according to the present invention, in a case of being set to the second display mode, it is preferable for the control unit to change a manner of displaying the second information relative to the first information displayed on the display unit, in accordance with the inclination of the body detected by the inclination detecting unit.

Moreover, in the electronic device according to the present invention, it is preferable for the control unit to cause the display unit to display a third virtual face and a fourth virtual face, the third virtual face displaying the first information, the fourth virtual face being partly or entirely overlapped with the third virtual face; in a case of being set to the first display mode, it is preferable for the control unit to cause the display unit to display the third virtual face, and restrict the fourth virtual face from being displayed, by entirely overlapping the third virtual face with the fourth virtual face; and in a case of being set to the second display mode, it is preferable for the control unit to cause the display unit to display the third virtual face and the fourth virtual face, which is partly overlapped with the third virtual face, in an oblique perspective manner in a same orientation.

In addition, in the electronic device according to the present invention, in a case of being set to the first display mode, it is preferable for the control unit to cause the display unit to display a plurality of pieces of the first information, and in a case of being set to the second display mode, it is preferable for the control unit to cause the display unit to display a plurality of pieces of the second information corresponding to the plurality of pieces of the first information, respectively, so as to correspond to the first information.

Furthermore, a display control method according to the present invention is a display control method for an electronic device including a display unit to display information on the display unit, in which the electronic device can set a display mode of the display unit to any one of: a first display mode for performing two-dimensional display; and a second display mode for performing three-dimensional display; and the display control method includes the steps of: displaying both of first information and second information, which is subordinate information to the first information, on the display unit, in a case of being set to the second display mode; and displaying any one of the first information and the second information on the display unit, in a case of being set to the first display mode.

Moreover, a display control program according to the present invention is a display control program for causing an electronic device including a display unit to execute processing for displaying information on the display unit, the display control program causes the electronic device to execute processing of: setting a display mode of the display unit to any one of: a first display mode for performing two-dimensional display; and a second display mode for performing three-dimensional display; and displaying both of first information and second information, which is subordinate information to the first information, on the display unit, in a case in which the electronic device is set to the second display mode, and displaying any one of the first information and the second information on the display unit, in a case in which the electronic device is set to the first display mode.

According to the present invention, information can be efficiently displayed in a display area.

DETAILED DESCRIPTION

Figure 1:
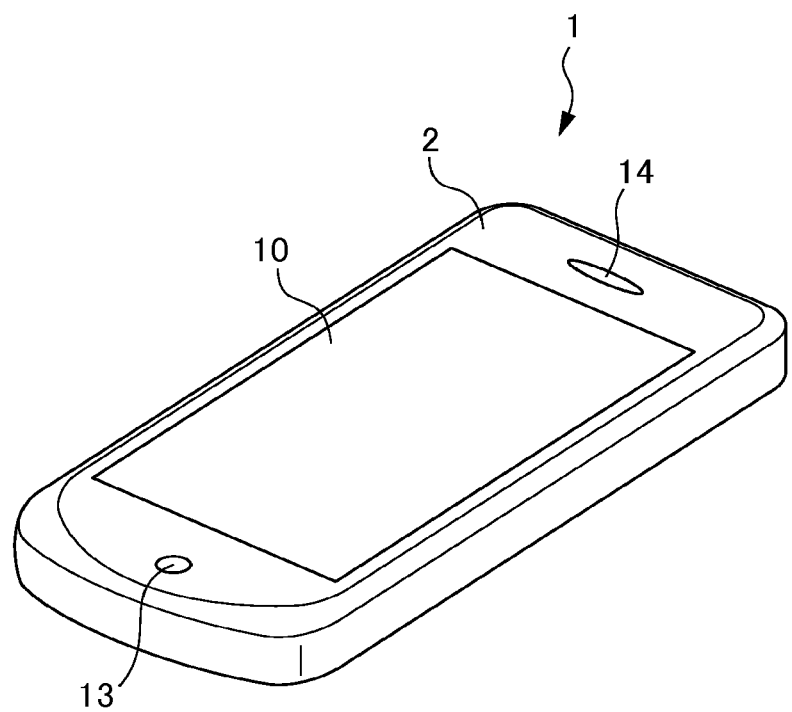
FIG. 1 is a perspective view showing an appearance of a cellular telephone device according to the present embodiment.

Descriptions are provided hereinafter regarding an embodiment of the present invention. First of all, with reference to FIG. 1, descriptions are provided for a basic structure of a cellular telephone device 1 according to an embodiment of the electronic device of the present invention. FIG. 1 is a perspective view showing an appearance of the cellular telephone device 1 according to the present embodiment.

The cellular telephone device 1 includes a body 2. A touch panel 10, a microphone 13 and a speaker 14 are disposed on a front face portion of the body 2.

Figure 2:
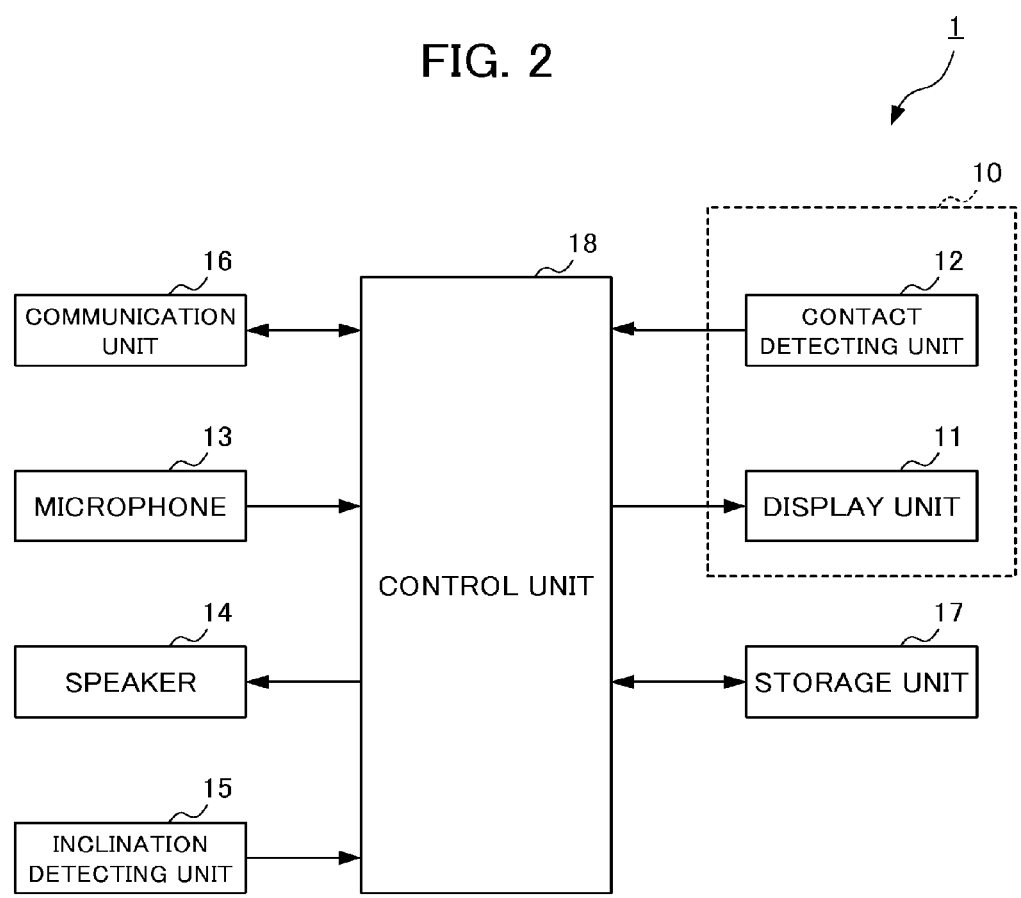
FIG. 2 is a block diagram showing functions of the cellular telephone device according to the present embodiment.

The touch panel 10 includes a display unit 11 and a contact detecting unit 12 (see FIG. 2). The display unit 11 is a liquid-crystal display panel, an organic EL (electroluminescence) display panel, or the like. The contact detecting unit 12 is disposed correspondingly to the display unit 11, and detects contact of an object such as a finger or stylus of a user of the cellular telephone device 1. In response to detecting contact of an object, the contact detecting unit 12 transmits a position of the contact to the control unit 18. For example, a sensor that employs a method such as a capacitive sensing method and a resistive film method can be utilized as the contact detecting unit 12.

The microphone 13 is used for inputting sound produced by the user of the cellular telephone device 1 during a telephone call.

The speaker 14 is used for outputting sound produced by the other party whom the user of the cellular telephone device 1 is talking with.

Next, a functional configuration of the cellular telephone device 1 is described with reference to FIG. 2. FIG. 2 is a block diagram showing the functional configuration of the cellular telephone device 1.

The cellular telephone device 1 includes the touch panel 10 (the display unit 11 and the contact detecting unit 12), the microphone 13, and the speaker 14, as described above. Moreover, the cellular telephone device 1 includes an inclination detecting unit 15, a communication unit 16, a storage unit 17, and a control unit 18.

The inclination detecting unit 15 is configured with a three-axis acceleration sensor and the like to detect an inclination angle of the body 2. In response to detecting an inclination angle of the body 2, the inclination detecting unit 15 transmits the angle to the control unit 18.

The communication unit 16 includes a main antenna (not illustrated) and an RF circuit unit (not illustrated), and performs communication with an external device such as a base station in a predetermined usable frequency band. More specifically, the communication unit 16 executes demodulation processing of a signal received via the main antenna, and transmits the signal thus processed to the control unit 18. In addition, the communication unit 16 executes modulation processing of a signal transmitted from the control unit 18, and transmits the signal to an external device via the main antenna.

The storage unit 17 includes, for example, working memory, and is utilized for arithmetic processing by the control unit 18. Furthermore, the storage unit 17 stores a single or plurality of applications running inside the cellular telephone device 1. It should be noted that the storage unit 17 may also serve as detachable external memory.

The control unit 18 controls the entirety of the cellular telephone device 1. For example, the control unit 18 performs predetermined control of the display unit 11, the speaker 14, and the communication unit 16. Moreover, in response to detecting contact of an object by the contact detecting unit 12, the control unit 18 executes various types of processing. In addition, in response to detecting an inclination angle of the body 2 by the inclination detecting unit 15, the control unit 18 executes various types of processing. Furthermore, when executing such processing, the control unit 18 controls the storage unit 17 to read various programs and data and write data. Moreover, the control unit 18 controls the display unit 11 to display first information and second information.

Here, the first information is character information such as, for example, a function name, a user name registered with an address book, or an email subject.

The second information is subordinate information to the first information, and is character information such as, for example, a supplementary explanation of a function name, or a telephone number and an address corresponding to the user name registered with the address book, or text of an email message.

Detailed descriptions are provided hereinafter regarding processing of display control performed by the control unit 18.

The control unit 18 functions as a mode setting unit, and sets a display mode of the display unit 11 to any one of: a first display mode for performing two-dimensional display; and a second display mode for performing three-dimensional display, in accordance with an inclination angle of the body 2 detected by the inclination detecting unit 15. More specifically, in a case in which the inclination angle of the body 2 detected by the inclination detecting unit 15 is at least a predetermined angle for a certain period of time, the control unit 18 changes the display mode from the first display mode to the second display mode. In addition, in a case in which the inclination angle of the body 2 detected by the inclination detecting unit 15 is less than the predetermined angle for the certain period of time, the control unit 18 changes the display mode from the second display mode to the first display mode.

Here, when an inclination angle of the body 2 is detected by the inclination detecting unit 15 when the first information is displayed in the first display mode, the control unit 18 assumes the inclination angle as a zero degree (reference angle), and performs display control by way of an angle relative to the reference angle.

It should be noted that the control unit 18 may change whether to allow the display mode to be changed in accordance with the inclination angle of the body 2, in response to detecting contact of a predetermined pattern by the detecting unit 12. Furthermore, in this case, the storage unit 17 may store information for controlling whether to allow the display mode to be changed in accordance with the inclination angle of the body 2.

The two-dimensional display refers to displaying character information in a manner that the character information is displayed on a plane. In other words, in a case in which character information is displayed on a first virtual face 11*a* of a virtual polyhedron, the two-dimensional display is a manner of displaying the first virtual face 11*a* so as to be viewed from its front.

On the other hand, the three-dimensional display refers to displaying character information in a manner that the character information is displayed on a surface of a three-dimensional object. In other words, in a case in which character information is displayed on the first virtual face 11*a* of the virtual polyhedron, and another character information is displayed on a second virtual face 11*b* adjacent to the first virtual face 11*a*, the three-dimensional display is a manner of displaying the first virtual face 11*a* and the second virtual face 11*b* so as to be viewed from a diagonal position.

In other words, by setting the display mode of the display unit 11 to any one of: the first display mode for performing two-dimensional display; and the second display mode for performing three-dimensional display, the control unit 18 can cause the display unit 11 to display the virtual polyhedron, in which the first information is displayed on the first virtual face 11*a*, and the second information is displayed on the second virtual face 11*b* adjacent to the first virtual face 11*a*.

In a case in which the display mode is set to the first display mode, the control unit 18 causes the display unit 11 to display the first information, and in a case in which the display mode is set to the second display mode, the control unit 18 causes the display unit 11 to display the first information and the second information.

More specifically, in a case in which the display mode is set to the first display mode, the control unit 18 causes the display unit 11 to display the first virtual face 11*a* of the virtual polyhedron in a two-dimensional manner. Moreover, in a case in which the display mode of the display unit 11 is set to the first display mode, the control unit 18 causes the display unit 11 to display the first information as a plurality of items in a list form, such as, for example, a menu that displays a plurality of functions, an address book that displays a plurality of user names registered with the address book, or a list of received email messages.

It should be noted that, although the first information is displayed as a plurality of items in a list form in the present embodiment, it is not limited thereto, and the first information may be displayed as a plurality of items in another form such as, for example, icons.

Figure 3:
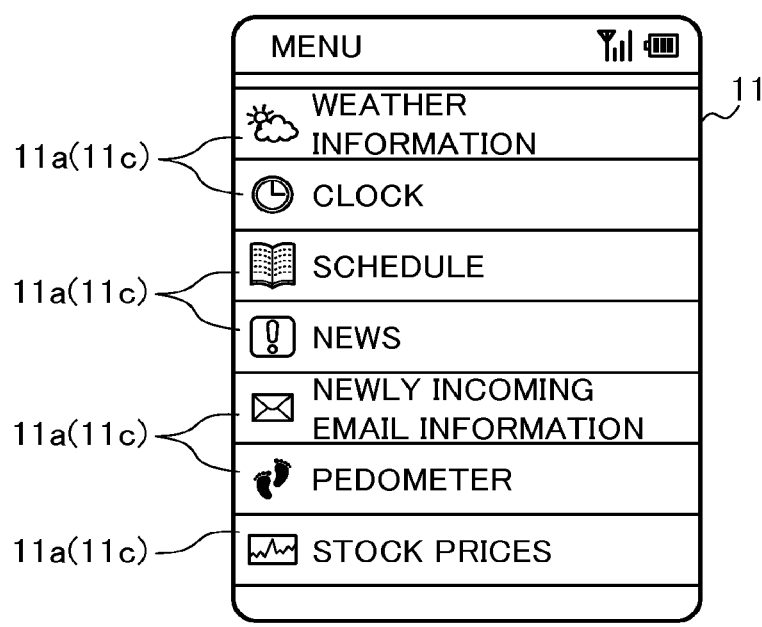
FIG. 3 is a diagram showing an example, in a case in which a display mode of a display unit according to the present embodiment is set to a first display mode, and first virtual faces (third virtual faces) are displayed on the display unit.

FIG. 3 is a diagram showing an example, in a case in which the display mode of the display unit 11 according to the present embodiment is set to the first display mode, and the first virtual faces 11*a* (third virtual faces 11*c*) are displayed on the display unit 11. As shown in FIG. 3, in a case in which the display mode of the display unit 11 is set to the first display mode, it is possible to recognize that the first information being displayed on the first virtual faces 11*a* is displayed in a two-dimensional manner. In addition, as shown in FIG. 3, it is possible to recognize that the first information is displayed as a plurality of items in a list form on the display unit 11.

In a case in which the display mode of the display unit 11 is set to the second display mode, the control unit 18 causes the display unit 11 to display a virtual polyhedron in a three-dimensional manner, in which the first information and the second information are displayed on the first virtual faces 11*a* and the second virtual faces 11*b*, respectively. Furthermore, in a case in which the display mode of the display unit 11 is set to the second display mode, the control unit 18 causes the display unit 11 to display the plurality of first virtual faces 11*a* in a list form, and causes the display unit 11 to display the plurality of second virtual faces 11*b* that display a plurality of pieces of the second information corresponding to a plurality of pieces of the first information, respectively, the second virtual faces 11*b* being adjacent to the first virtual faces 11*a* that display the first information.

Moreover, in a case in which the display mode of the display unit 11 is set to the second display mode, the control unit 18 causes the display unit 11 to display the first virtual faces 11*a* in an oblique perspective manner in an orientation, and causes the display unit 11 to display the second virtual faces 11*b* in an oblique perspective manner in an orientation different from the orientation of the first virtual faces 11*a*. It should be noted that, in the present embodiment, descriptions are provided such that the control unit 18 causes the display unit 11 to display the first virtual faces 11*a* in a case in which the display mode is set to the second display mode; however, the control unit 18 may cause the display unit 11 to display the first virtual faces 11*a* and the second virtual faces 11*b*, at least one of which is displayed obliquely to another, in a case in which the display mode is set to the second display mode.

In addition, in a case in which the display mode is set to the second display mode, the control unit 18 changes a manner of displaying the second information relative to the first information displayed on the display unit 11, in accordance with an inclination angle of the body 2 detected by the inclination detecting unit 15. More specifically, the control unit 18 performs display control such that, as the inclination angle of the body 2 detected by the inclination detecting unit 15 is increased, an area for displaying the first information is decreased, and an area for displaying the second information is increased.

Figure 4A:
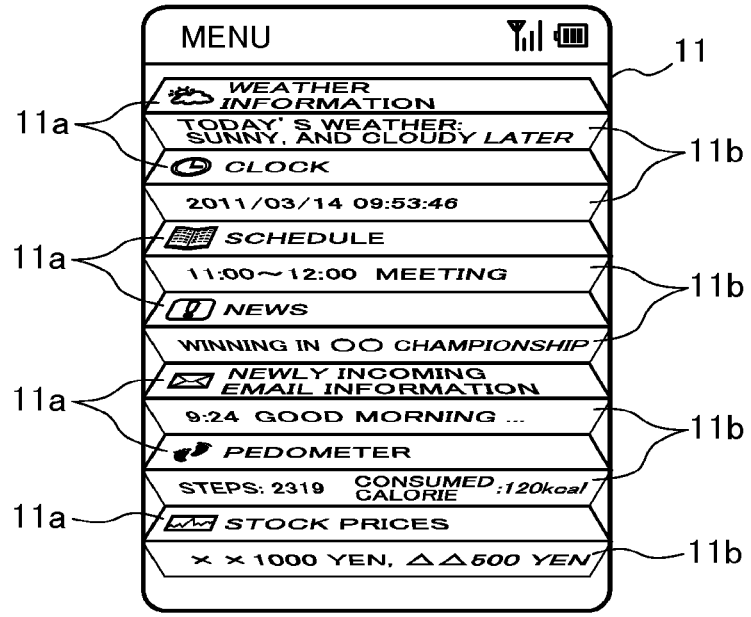
FIG. 4A is a diagram showing an example, in a case in which the display mode of the display unit according to the present embodiment is set to a second display mode, and the first virtual faces and second virtual faces are displayed on the display unit.
Figure 4B:
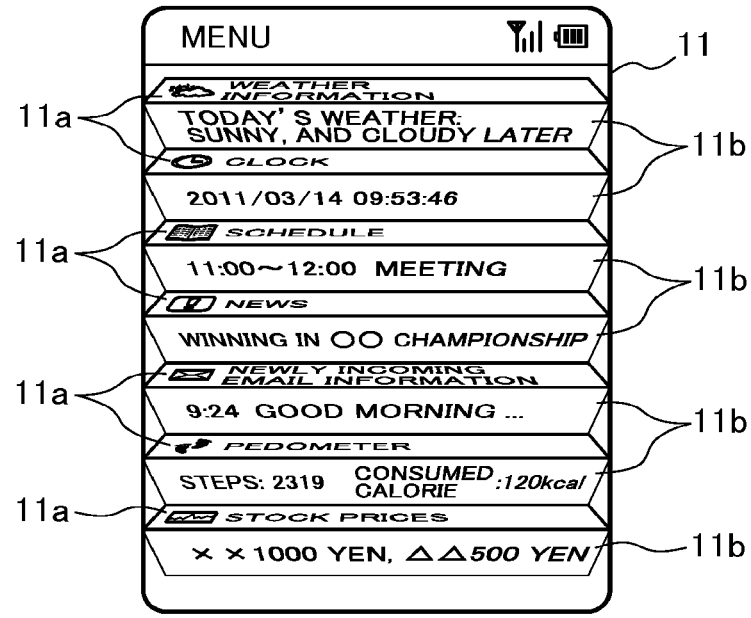
FIG. 4B is a diagram showing another example, in a case in which the display mode of the display unit according to the present embodiment is set to a second display mode, and the first virtual faces and second virtual faces are displayed on the display unit.

Each of FIG. 4A and FIG. 4B is a diagram showing an example, in a case in which the display mode of the display unit 11 according to the present embodiment is set to the second display mode, and the first virtual faces 11a and the second virtual faces 11b are displayed on the display unit 11. FIG. 4A is a diagram showing a display manner of the display unit 11, in a case in which an inclination angle of the body 2 detected by the inclination detecting unit 15 is a first angle that is not the reference angle. FIG. 4B is a diagram showing a display manner of the display unit 11, in a case in which an inclination angle of the body 2 detected by the inclination detecting unit 15 is a second angle that is greater than the first angle.

As shown in FIGS. 4A and 4B, in a case in which the display mode of the display unit 11 is set to the second display mode, it is possible to recognize that the first virtual faces 11a and the second virtual faces 11b are displayed in a three-dimensional manner. Furthermore, as shown in FIGS. 4A and 4B, in a case in which the display mode of the display unit 11 is set to the second display mode, it is possible to recognize that the first information is displayed as a plurality of items in a list form, and the second information is displayed as a plurality of items corresponding to and being adjacent to the plurality of items of the first information, respectively, on the display unit 11.

Moreover, it is possible to recognize that the area for displaying the first information in FIG. 4B is smaller than the area for displaying the first information in FIG. 4A, and the area for displaying the second information in FIG. 4B is larger than the area for displaying the second information in FIG. 4A.

It should be noted that, when the display manner is changed, in the display manner described above, the proportion of the areas for displaying the first virtual faces 11a and the second virtual faces 11b is changed; however, the embodiment is not limited thereto. For example, while maintaining the proportion of the areas, the control unit 18 may change virtual orientations of the first virtual faces 11a and the second virtual faces, in accordance with an angle detected by the inclination detecting unit 15.

It should be noted that, in the above description, the control unit 18 performs display control such that character information is displayed on the first virtual faces 11a of the virtual polyhedron, and character information is displayed on the second virtual faces 11b adjacent to the first virtual faces 11a; however, the display control is not limited thereto. For example, the control unit 18 may perform display control based on a virtual display state, in which the first information is displayed on the third virtual faces 11c, and the second information is displayed on fourth virtual faces 11d, the fourth virtual faces 11d being separated from the third virtual faces 11c in a predetermined direction, and being partly or entirely overlapped with the third virtual faces 11c in a predetermined direction, in a virtual space.

In this case, in a case in which the display mode is set to the first display mode, the control unit 18 causes the display unit 11 to display the third virtual faces 11c in a two-dimensional manner, and restricts the fourth virtual faces 11d from being displayed on the display unit 11 by entirely overlapping the third virtual faces 11c with the fourth virtual faces 11d. In this case, the first information is displayed similarly to the display example shown in FIG. 3.

In addition, in a case in which the display mode is set to the second display mode, the control unit 18 causes the display unit 11 to display the third virtual faces 11c and the fourth virtual faces 11d in a three-dimensional and oblique perspective manner in the same orientation. In other words, in a case in which the display mode is set to the second display mode, the control unit 18 causes the display unit 11 to display the third virtual faces 11c and the fourth virtual faces 11d, in a manner of displaying both of the third virtual faces 11c and the fourth virtual faces 11d. More specifically, the control unit 18 causes the display unit 11 to display both of the third virtual faces 11c and the fourth virtual faces 11d, by partly overlapping the third virtual faces 11c with the fourth virtual faces 11d. Furthermore, the control unit 18 causes the display unit 11 to display the first information in an oblique perspective manner in an orientation, and causes the display unit 11 to display the second information in an oblique perspective manner in the same orientation.

Figure 5:
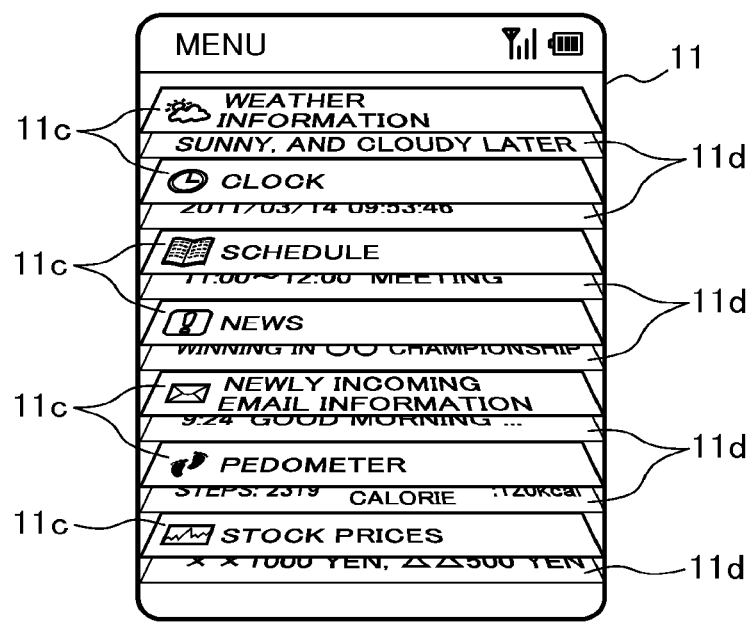
FIG. 5 is a diagram showing an example, in a case in which the display mode of the display unit according to the present embodiment is set to the second display mode, and the third virtual faces and fourth virtual faces are displayed on the display unit.

FIG. 5 is a diagram showing an example, in a case in which the display mode of the display unit 11 according to the present embodiment is set to the second display mode, and the third virtual faces 11c and the fourth virtual faces 11d are displayed on the display unit 11. In FIG. 5, it is possible to recognize that the first information and the second information are displayed in an oblique perspective manner in the same direction, unlike the display example shown in FIG. 4. It should be noted that, in FIG. 5, the fourth virtual faces 11d are displayed in a state where the fourth virtual faces 11d are partly not displayed; however, the control unit 18 may perform display control of reducing the areas of the fourth virtual faces 11d being not displayed, as the inclination angle of the body 2 detected by the inclination detecting unit 15 is increased.

Figure 6:
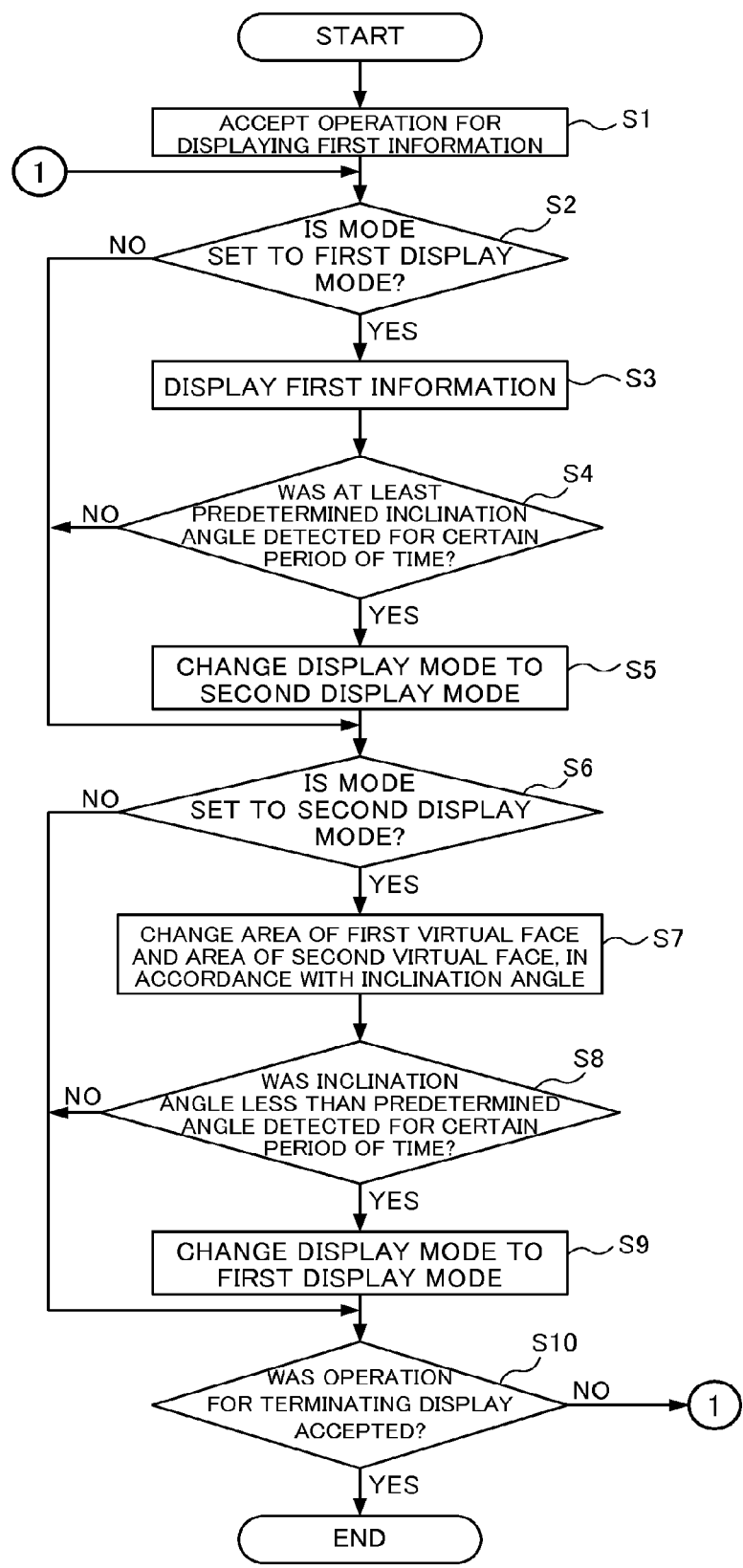
FIG. 6 is a flow chart showing a flow of processing by a control unit according to the present embodiment to display first information and second information on the display unit.

Next, descriptions are provided for a flow of processing by the control unit 18 to display the first information and the second information on the display unit 11. FIG. 6 is a flow chart showing a flow of processing by the control unit 18 according to the present embodiment to display the first information and the second information on the display unit 11.

In Step S1, the control unit 18 accepts an operation for displaying the first information, via the contact detecting unit 12.

In Step S2, the control unit 18 determines whether the display mode of the display unit 11 is set to the first display mode. In a case in which the determination is YES, the control unit 18 advances the processing to Step S3, and in a case in which the determination is NO, the control unit 18 advances the processing to Step S6.

In Step S3, the control unit 18 causes the display unit 11 to display the first information in a two-dimensional manner.

In Step 4, the control unit 18 determines whether the inclination angle of the body 2 detected by the inclination detecting unit 15 is at least a predetermined angle for a certain period of time. In a case in which the determination is YES, the control unit 18 advances the processing to Step S5, and in a case in which the determination is NO, the control unit 18 advances the processing to Step S6.

In Step S5, the control unit 18 changes the display mode of the display unit 11 from the first display mode to the second display mode.

In Step S6, the control unit 18 determines whether the display mode of the display unit 11 is set to the second display mode. In a case in which the determination is YES, the control unit 18 advances the processing to Step S7, and in a case in which the determination is NO, the control unit 18 advances the processing to Step S10.

In Step S7, the control unit 18 causes to the display unit 11 to display the first information and the second information in a three-dimensional manner. In addition, in accordance with the inclination angle of the body 2 detected by the inclination detecting unit 15, the control unit 18 changes the proportion of the area for displaying the first information and the area for displaying the second information on the display unit 11.

In Step 8, the control unit 18 determines whether the inclination angle of the body 2 detected by the inclination detecting unit 15 is less than a predetermined angle for a certain period of time. In a case in which the determination is YES, the control unit 18 advances the processing to Step S9, and in a case in which the determination is NO, the control unit 18 advances the processing to Step S10.

In Step S9, the control unit 18 changes the display mode of the display unit 11 from the second display mode to the first display mode.

In Step S10, the control unit 18 determines whether an operation for terminating the display of the first information displayed on the display unit 11 was accepted via the contact detecting unit 12. In a case in which the determination is YES, the control unit 18 terminates the processing in the present flowchart, and in a case in which the determination is NO, the control unit 18 advances the processing to Step S2.

As described above, according to the present embodiment, with the control unit 18, the cellular telephone device 1 sets the display mode of the display unit 11 to any one of: the first display mode for performing two-dimensional display; and the second display mode for performing three-dimensional display. In addition, with the control unit 18, in a case of being set to the second display mode, the cellular telephone device 1 displays both of the first information and the second information, which is subordinate information to the first information, on the display unit 11, and in a case of being set to the first display mode, the cellular telephone device 1 displays any one of the first information and the second information on the display unit 11.

Therefore, since the cellular telephone device 1 can display both of the first information and the second information, which is the subordinate information to the first information, on the display unit 11, the information can be efficiently displayed in a single display area.

Furthermore, in a case of being set to the second display mode, the cellular telephone device 1 displays the second information correspondingly to the first information on the display unit 11; therefore, the user can easily recognize the second information corresponding to the first information.

Moreover, in a case of being set to the first display mode, the cellular telephone device 1 displays the first virtual faces 11a in a two-dimensional manner on the display unit 11, and in a case of being set to the second display mode, the cellular telephone device 1 displays the virtual polyhedron in a three-dimensional manner on the display unit 11, and displays the first information and the second information on the first virtual faces 11a and the second virtual faces 11b, respectively. In addition, in a case of being set to the second display mode, the cellular telephone device 1 displays the first information and the second information, at least one of which is displayed obliquely to another.

Therefore, in a case of being set to the second display mode, the cellular telephone device 1 can display the first information and the second information in a three-dimensional manner.

Furthermore, since the cellular telephone device 1 sets the display mode to any one of the first display mode and the second display mode in accordance with the inclination angle of the body 2 detected by the inclination detecting unit 15, the first display mode or the second display mode can be set through an operation that is intuitive for the user.

Moreover, in a case of being set to the second display mode, the cellular telephone device 1 changes the manner of displaying the second information relative to the first information displayed on the display unit 11, in accordance with the inclination angle detected by the inclination detecting unit 15; therefore, the user can perform an operation with a feeling as if tilting a three-dimensional object displayed on the display unit 11.

In addition, in a case in which the third virtual faces 11c and the fourth virtual faces 11d are displayed, the third virtual faces 11c displaying the first information and being overlapped with a part or all of the fourth virtual faces 11d, and the display mode is set to the first display mode, the cellular telephone device 1 displays the third virtual faces 11c, and restricts the fourth virtual faces 11d from being displayed, by entirely overlapping the third virtual faces 11c with the fourth virtual faces 11d.

Therefore, in a case of being set to the second display mode, the cellular telephone device 1 can display the second information in a three-dimensional manner, with a feeling as if looking into the fourth virtual faces 11d disposed under the third virtual faces 11c.

Furthermore, in a case of being set to the first display mode, the cellular telephone device 1 displays the plurality of pieces of the first information on the display unit 11, and in a case of being set to the second display mode, the cellular telephone device 1 displays the second information corresponding to the first information so as to be adjacent to the first information on the display unit 11. Therefore, the cellular telephone device 1 can efficiently display the first information and the second information, such that the plurality of pieces of the first information correspond to the plurality of pieces of the second information, respectively.

Although an embodiment of the present invention has been described above, the present invention is not limited to the aforementioned embodiment. Moreover, the effects described in the embodiment of the present invention merely exemplify the most preferable effects arising from the present invention, and the effects according to the present invention are not limited to those described in the embodiment of the present invention.

For example, in a case of being set to the first display mode, the description has been provided for the display manner with reference to FIG. 3, in which only the first virtual faces 11a (the third virtual faces 11c) are displayed on the display unit 11; however, the display manner is not limited thereto, and only the second virtual faces 11b (the fourth virtual faces 11d) may be displayed on the display unit 11.

Although the present invention has been described for the cellular telephone device 1 including the touch panel 10, the present invention may be applied to a cellular telephone device without the touch panel 10. The cellular telephone device may be of: a straight type; a folder type in which two bodies are connected via a hinge; a slider type in which one of the bodies slides to one direction in a state in which the bodies are mutually superimposed; or a rotating (turning) type in which one of the bodies is rotated around an axis line along the direction of superimposing the bodies.

In addition, although the aforementioned embodiment has been described by illustrating the cases in which the present invention is applied to the cellular telephone device 1, the present invention is not limited thereto. The present invention can also be applied to an electronic device such as a PHS (Personal Handyphone System), a PDA (Personal Digital Assistant) or a portable gaming machine.

What is claimed is:

1. An electronic device, comprising:
a display unit;
an inclination detecting unit configured to detect an angle of inclination of the electronic device; and
a control unit configured to set any one of:
a first display mode for causing the display unit to display any one face of a first face for displaying first information, and a second face for displaying second information, which is subordinate information to the first information; and a second display mode for causing the display unit to display both of the one face and an other face, in a state where the one face is partly overlapped with the other face, wherein in the second display mode, the control unit is configured to reduce overlapped areas of the one face and the other face, in accordance with the angle of the inclination detected by the inclination detecting unit,
the control unit is configured to switch between the first and second display modes according to a comparison between a predetermined angle and the detected angle of the inclination for a predetermined period of time; and
wherein the control unit is configured to
switch the first display mode to the second display mode when the detected angle of the inclination of the electronic device is not smaller than the predetermined angle for the predetermined period of time, and switch the second display mode to the first display mode when the detected angle of the inclination of the electronic device is smaller than the predetermined angle for the predetermined period of time.

2. The electronic device according to claim 1, wherein the control unit is configured to reduce the overlapped areas, in accordance with an angle relative to the angle of the inclination when both of the one face and the other face are displayed in the second display mode.

3. The electronic device according to claim 2, wherein, in the second display mode, the control unit is configured to reduce the overlapped areas, as the angle of the inclination is increased in relation to the angle of the inclination value of the inclination when both of the one face and the other face are displayed in the second display mode.

4. The electronic device according to claim 1, further comprising:
wherein, in the first display mode, the control unit is configured to not change a display aspect of the one face, in accordance with the angle of the inclination detected by the inclination detecting unit.

5. The electronic device according to claim 1, wherein in the second display mode, the control unit is configured to move at least one of the one face and the other face to reduce the overlapped areas of the one face and the other face, in accordance with the angle of the inclination of the electronic device detected by the inclination detecting unit.

6. An electronic device, comprising:
a display unit; an inclination detecting unit configured to detect an angle of inclination of the electronic device; and
a control unit configured to set a display mode of the display unit to any one of:
a first display mode for displaying a face for displaying character information in a two-dimensional manner; and a second display mode for displaying a plurality of faces for displaying character information in a three-dimensional manner, wherein in the first display mode, the control unit is configured to cause the display unit to display the face in a two-dimensional manner, in the second display mode, in a state where at least two faces of the plurality of faces are partly overlapped with each other, the control unit is configured to cause the display unit to display the two faces in an oblique perspective manner in a same orientation so as to be displayed in a three-dimensional manner; and the control unit is configured to reduce overlapped areas of the two faces, in accordance with an inclination value of the inclination detected by the inclination detecting unit in the second display mode, and the control unit is configured to switch between the first and second display modes according to a comparison between a predetermined value and the detected angle of the inclination for a predetermined period of time; and
wherein the control unit is configured to
switch the first display mode to the second display mode when the detected angle of the inclination of the electronic device is not smaller than the predetermined angle for the predetermined period of time, and switch the second display mode to the first display mode when the detected angle of the inclination of the electronic device is smaller than the predetermined angle for the predetermined period of time.

7. The electronic device according to claim 6, wherein the control unit is configured to reduce the overlapped areas of the two faces, as an angle of the inclination value of the inclination detected by the inclination detecting unit is increased.

8. The electronic device according to claim 6, wherein, in the first display mode, the control unit is configured to not change a display aspect of the faces, in accordance with the angle of the inclination detected by the inclination detecting unit.

9. The electronic device according to claim 6, wherein the control unit is configured to move at least one of the two faces to reduce the overlapped areas of the two faces, in accordance with an angle of the inclination value of the inclination of the electronic device detected by the inclination detecting unit in the second display mode.

* * * * *